United States Patent [19]

Pazel

[11] Patent Number: 5,410,648
[45] Date of Patent: Apr. 25, 1995

[54] DEBUGGING SYSTEM WHEREIN MULTIPLE CODE VIEWS ARE SIMULTANEOUSLY MANAGED

[75] Inventor: Donald P. Pazel, Croton-on-Hudson, N.Y.

[73] Assignee: International Business Machines Corporation, Armonk, N.Y.

[21] Appl. No.: 753,358

[22] Filed: Aug. 30, 1991

[51] Int. Cl.⁶ .................. G06F 9/45; G06F 17/24
[52] U.S. Cl. .................. 395/158; 395/600; 364/192; 364/DIG. 2; 364/948.2; 364/948.21; 371/19
[58] Field of Search ........... 395/650, 275, 575, 700, 395/375, 800, 700, 144, 158, 600; 371/19; 364/191, 192

[56] References Cited

U.S. PATENT DOCUMENTS 5,179,702  1/1993  Spix et al. .................. 395/650

OTHER PUBLICATIONS

Parker, Tim, "C Development Environments", *Computer Language*, vol. 7, No. 5, May 1990, pp. 97–110.
Ambler et al., "Influence of Visual Technology on the Evolution of Language Environments", *Computer*, Oct. 1989, pp. 19–22.
Leonard I. Vanek et al., "Static Analysis of Program Source Code Using EDSA", pp. 192 199, Array Systems Computing, Canada 1989.
Logitech, Inc., "Multiscope Debugger User's Manual", Jul. 1989 pp. 1–8 2nd pamphlet, pp. 23–82.
Microsoft Corporation, "Advanced Programming Techniques", pp. 185–205, Copyright, 1990.

*Primary Examiner*—Paul V. Kulik
*Assistant Examiner*—Paul R. Lintz
*Attorney, Agent, or Firm*—Perman & Green

[57] ABSTRACT

A computer-implemented method is described for displaying on a screen, a plurality of views of a software code listing. The method includes the steps of displaying a first view-type of at least a portion of the software code listing and selecting and displaying additional view-types of the software code listing. The system includes a prioritized listing of view-types, each view-type providing a different presentation of a code listing. When a program listing in one file presents a call to another file, the system automatically presents a window including the called code listing, with the view-type automatically selected in accordance with the preestablished priority listing. Windows/code views are handled as objects, and are thus immediately recallable using a graphical interface.

11 Claims, 5 Drawing Sheets

DEBUGGING SYSTEM WHEREIN MULTIPLE CODE VIEWS ARE SIMULTANEOUSLY MANAGED

FIELD OF THE INVENTION

This invention relates to methods and systems in the field of software programing development, and more particularly, to a debugging system which provides the user with an ability to display and correct software programs.

BACKGROUND OF THE INVENTION

Typically, a programmer develops and tests a software program for a computer by producing and entering source code into files through the use of an editor program. The computer then creates an executable program by translating the source code listing into machine code by running a series of programs which typically include various preprocessors, a compiler, a linker, etc. During the conversion of the source code listing to machine code, intermediate code listings may be created, e.g. a disassembly code describing subtasks within tasks defined by lines of source code; a mixed source/disassembly listing wherein both source lines and disassembly lines are sequentially listed, and other types of intermediate code structures.

Editors are programs which are used to enter or change source code and must, therefore, have the capability to display the source code for the user.

The term "line of code" will be used hereinafter and refers to (approximately) a complete instruction in the particular code language. A line of code will generally display as one line on a user display device.

A debugging system is a combination of computer hardware and debugger software which executes a user's program in a controlled manner. Debuggers aid a user in identifying and correcting mistakes in an authored program and allow the program to be executed in small segments until specified machine addresses (breakpoints) are encountered or until certain events occur (exception events). During operation of a debugger, the executing code listing is displayed, with the active line of code highlighted or otherwise indicated. The "active" line of code, in this instance, refers to a line of code which executes its defined function when the user steps to a next line of code.

Debugging software systems exist in the prior art. One such debugging system is described by Vanek et al. in "Static Analysis of Program Source Code Using EDSA", Proceedings of Conference on Software Maintenance, pages 192-199, October, 1989. Vanek et al. describe a debugging system wherein the user is enabled to view displayed code listings. All views disclosed by Vanek et al. have identical display characteristics. Each view can contain a subset of lines of the original source program and may show only declarations, only statements at or above a given level of syntactic nesting, all statements that assign a value to a given variable etc. New views may be inserted by logical operators. The EDSA system, further, is tied to the program being analyzed since it must have access to the complete details of the program which it, in turn, represents as a syntax tree and which it stores in a file.

Logitech Inc., 1235 Pear Avenue, No. 111 Mountain View, Calif. 94043 markets a window-based debugging program entitled "MultiScope" for debugging the programs written to operate in the OS/2 system program environment. The MultiScope debugging system includes both run-time and post-mortem debuggers which employ either a presentation manager or text mode interface.

MultiScope has two windows to show program codes. One window is called the Source window, and the other is called the Assembler window. The Source window shows the current code line in a high level language, and the assembler window shows it in one of several possible variants of a disassembly view. As one steps through execution, the current line shows highlighted in both views and moves with execution. The contents of the Source window can be changed to show other file/views in the appropriate higher level language. If the higher level view does not exist, an error message is placed in the Source window. The Assembler window can, as well, be reset to show a disassembly view of another source file.

Codeview, a debugger marketed by the Microsoft Corporation, Redmond, Wash., runs in a character mode within an OS/2 session window. Codeview has two windows to show program code. From either window, one may see different files in different views (source, assembler, etc.). However, only one of the windows will show the current line, i.e. the "active" window. So, if some file/view has the current line of execution, and it is showing in the active window, the appropriate line will be highlighted. But if the same view is in the other window, the current line is not highlighted. In both windows, the user may change the window contents to show different file/views.

Both MultiScope and Codeview handle the window, per se, as a separate object, independent of the code view displayed therein. Thus, if the user "closes" a window, there is no retention of the window and its contents as an object. When a user wishes to resurrect the window, both the file to be displayed and the code lines to be shown must be remembered and specified. Otherwise the window displays the initial lines of the code listing, rather than the code listing that was last shown. Furthermore, both MultiScope and Codeview are limited to two windows, and have no capability for further views.

Accordingly, it is an object of this invention to provide an improved debugging system which enables plural code listings to be simultaneously viewed, closed and recalled.

It is another object of this invention to provide an improved debugging system which enables simultaneous viewing and view management of different language manifestations of a code listing.

SUMMARY OF THE INVENTION

A computer-implemented method is described for displaying on a screen, a plurality of views of a software code listing. The method includes the steps of displaying a first view-type of at least a portion of the software code listing and selecting and displaying additional view-types of the software code listing. The system includes a prioritized listing of view-types, each view-type providing a different presentation of a code listing. When a program listing in one file presents a call to another file, the system automatically presents a window including the called code listing, with the view-type automatically selected in accordance with the preestablished priority listing. Windows/code views are handled as objects, and are thus immediately recallable using a graphical interface.

DETAILED DESCRIPTION OF THE INVENTION

In this description the terms "view" and "view-type" will be employed. A "view" of a program listing may be either a sequence of lines of text depicting the program listing, a graphical representation of a portion of the program listing, or a combination of the two. A "view-type" of a program is a view wherein the program listing is shown as either a source code listing; a disassembled source code listing; a mixture of source and disassembled source code; a control flow graph; or a compressed program view.

A source view-type is the highest level language that is translated to machine language before the program can be run. It will generally be presented as a series of lines of source code statements, each line being sequentially numbered. A disassembled source code view-type is one wherein various subtasks within a task (as defined by a source line) are shown in an intermediate language in lieu of the source line. A mixed source/disassembly view-type is one wherein both source lines and disassembled source lines are shown together. A control flow graph is a view-type wherein the software program is depicted as a graphical flow-diagram. A compressed program view-type is one wherein the program listing is shown as though viewed from a long distance away, wherein individual lines of text cannot be discerned. The view, however, shows the overall arrangement of the lines of text, indentations, spaces etc. and may, in addition, indicate a box showing where, in the overall code sequence, a particular active line of code exists.

Figure 1:
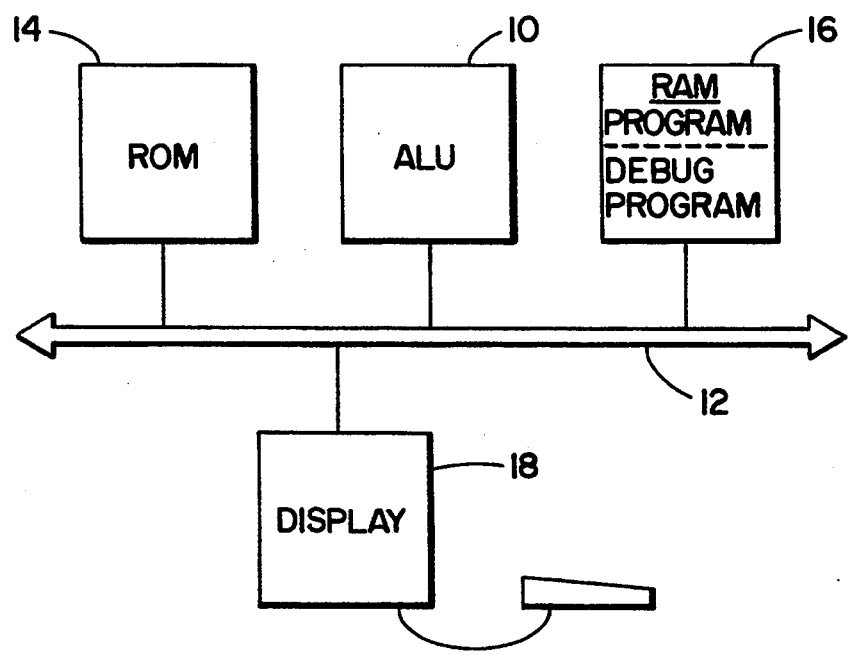
FIG. 1 is a high level block diagram of a data processing system wherein the debugging invention herein described may be employed.

Referring now to FIG. 1, a high level block diagram is shown of a data processing system that is adapted to operate the multi-view debugging system of this invention. An arithmetic logic unit 10 communicates via a bus 12 with a read only memory (ROM) 14, random access memory (RAM) 16 and a display 18. RAM 16 contains both the program being debugged, its various view-types, and a software listing of the debug program.

The debug program is initially operated by a user to compile in RAM 16 a table that lists the source code files/modules in the program to be debugged. If no source listing is available, the debug program can construct a disassembly set of source statements from an object code listing. Thus, while a disassembly listing will always be available, source code listings may not be. For instance, many programs contain files produced in response to a source code listing but, in themselves, have no controlling source code statements. They are internally produced within the machine for use as an invisible "utility" or for another similar function.

In the process of debugging, the user views the program on display 18 and steps from line of code to line of code to determine where a crash (or crashes) occur. It is often the case that the user wishes to view a code listing other than a source listing and further, wishes to have multiple, simultaneous views of the executing software, at various levels. Such views potentially enable faster troubleshooting and rapid debugging of the software.

Figure 2:
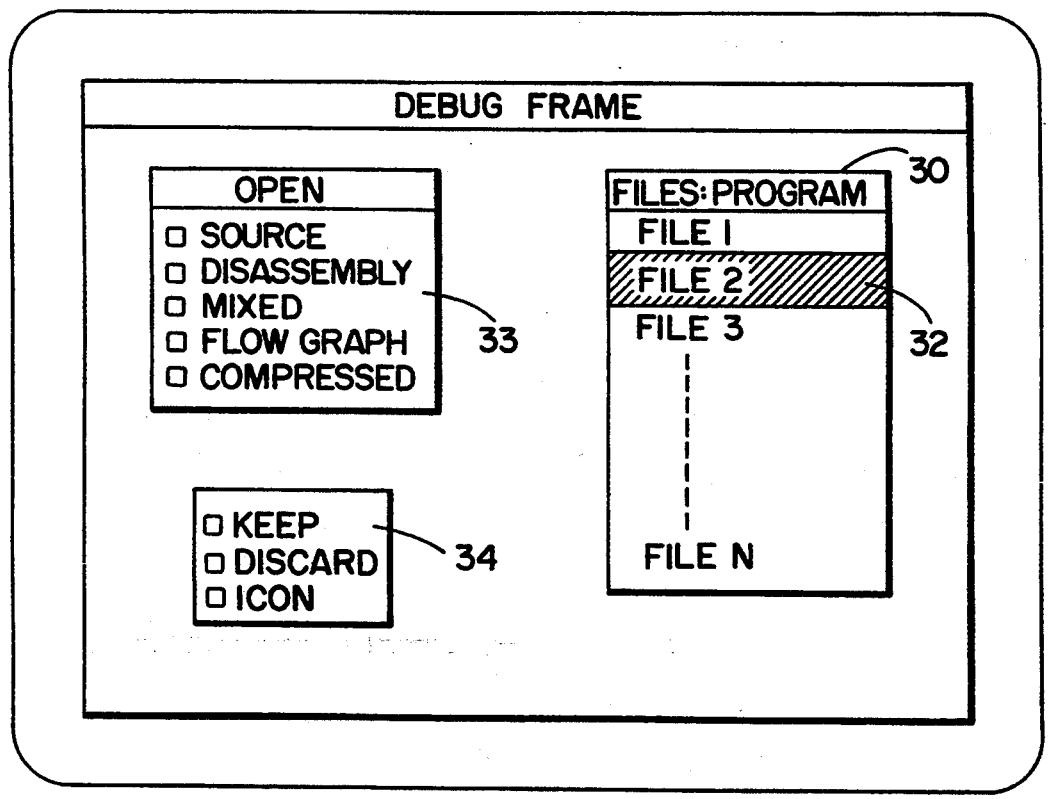
FIG. 2 illustrates a Debug Frame presented to the viewer that enables selection of a particular file and its view-type.

In FIG. 2, a view is shown of a Debug Frame wherein menus appear that enable function and presentation view-type to be user-selected. The Debug Frame is a window in the debugger software which acts as the master control for the debugger.

Window 30 in the Debug Frame provides a listing of files in the program to be debugged. A highlight line 32 may be stepped down the listing of files to enable selection of one for debugging. Window 33 enables the user to select one of five listed view-types that are available in the system (as defined above). If the user chooses a source listing and such is not available, the system automatically provides the next lower priority listing, i.e. disassembly. In window 33, the view-types are listed in priority order, however, it is to be understood that any priority can be arbitrarily assigned by the system user. The user's choice of view-type for the highlighted file in window 30 is only applicable to that file and to no others. Thus, as will be seen hereafter, if a source code listing for a portion of file 2 presents a call for a code listing in another file, the system automatically chooses the highest priority view-type available for the called listing, irrespective of the view-type chosen for file 2.

A further window 34 is contained within the Debug Frame and contains three additional user choice fields, i.e., Keep, Discard, and Icon. These fields come into use when one program listing in a file calls a line of code in a program listing in another file. A selection of the "Keep" field results in a displayed view-type being retained on the screen, while a new code listing view is simultaneously displayed. A "Discard" selection causes the current view-type on the screen to be removed and discarded. A selection of the "Icon" indication causes the view-type on the screen to be removed from the screen and replaced by an icon. At that time, a further view-type can be displayed and the "iconized" view-type is again displayable on the screen simply by a selection of the icon (by a mouse or other indicator).

As above indicated, views may and will be replaced, discarded, etc. by the user from the screen. It is often the case, however, that the user wishes to retrace steps and to resurrect discarded views. In contrast to the prior art, this invention enables the user to accomplish this without requiring detailed record-keeping on the part of the user. In this system, each file has an associated window (or windows), which, in combination with its current view, is maintained as an object. Thus, when a window is removed from the screen, its scroll position, window size, window position, and other display attributes are stored. By simply recalling the window associated with a file, the "saved" window and its contents are displayed, without further user intervention. No user-initiated editing is required to reestablish a previous window's contents.

Figure 3:
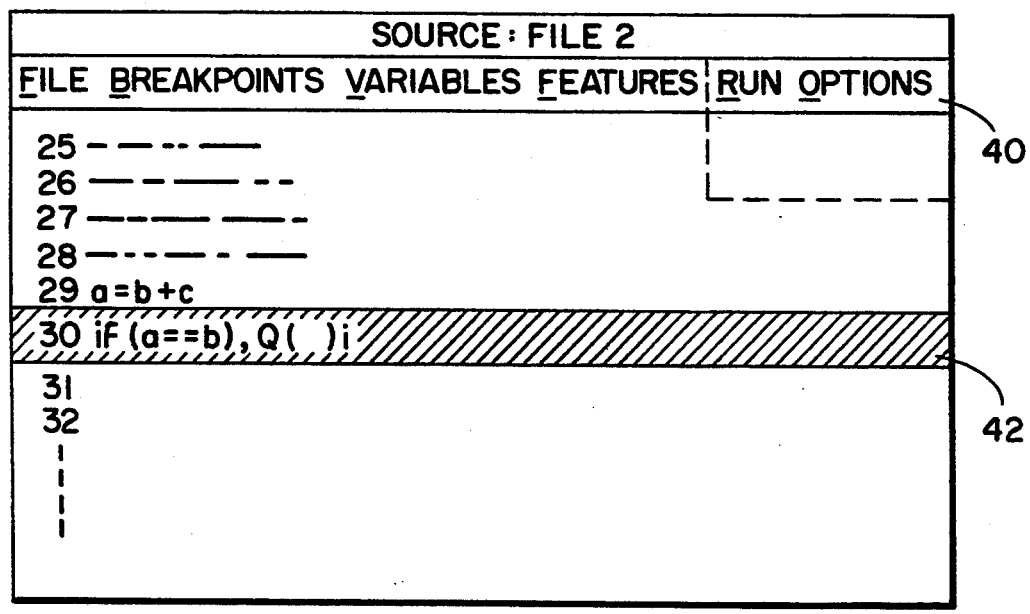
FIG. 3 shows a view of a source code listing.

Turning now to FIG. 3, a representative source code listing in file 2 is illustrated. A selection bar 40 runs across the top of the screen and contains a plurality of selection items, each one of which results in the display of a pull-down window (see FIGS. 4 and 5). A plurality of source code lines are shown on the screen, with lines 29 and 30 illustrating a simple function (A=B+C), followed by a conditional call to a subroutine "Q" if A=B. Subroutine Q is not present in file 2. It is to be noted that line 30 (wherein the call to subroutine Q is indicated) is highlighted as shown at 42, but the functions called for by the statement there indicated have not yet been executed. That execution only occurs when the user steps the source listing to line 31.

Figure 4:
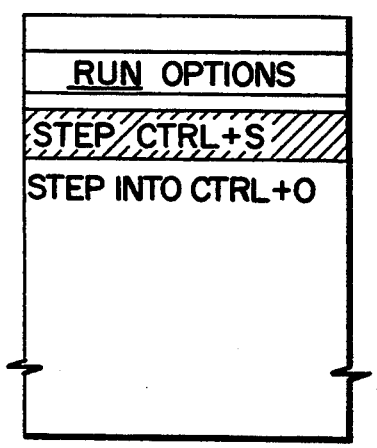
FIG. 4 shows a pull-down menu illustrating various Run selections.
Figure 5:
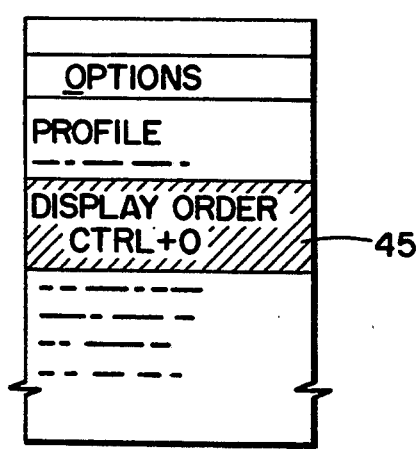
FIG. 5 shows a pull-down menu illustrating Options available which enable a display priority order to be identified and changed.

As shown in FIG. 4, a selection of the "run" indication in selection bar 40 of FIG. 3 causes a pull-down menu to appear that designates a number of options available to the user to increment through the code listing. In this instance, it is assumed that the "step" indication 43 has been selected (by the highlight). This indication enables the user to increment one line of code under control of simultaneous actuation of two keyboard keys (control and S). At FIG. 5, a pull-down is shown which results when the options indication is chosen on selection bar 40. The pull-down shows that a "display order" select function 45 is available. The selection of this line enables the priority order shown at window 33 in FIG. 2 to be revised.

Figures 6, 7:
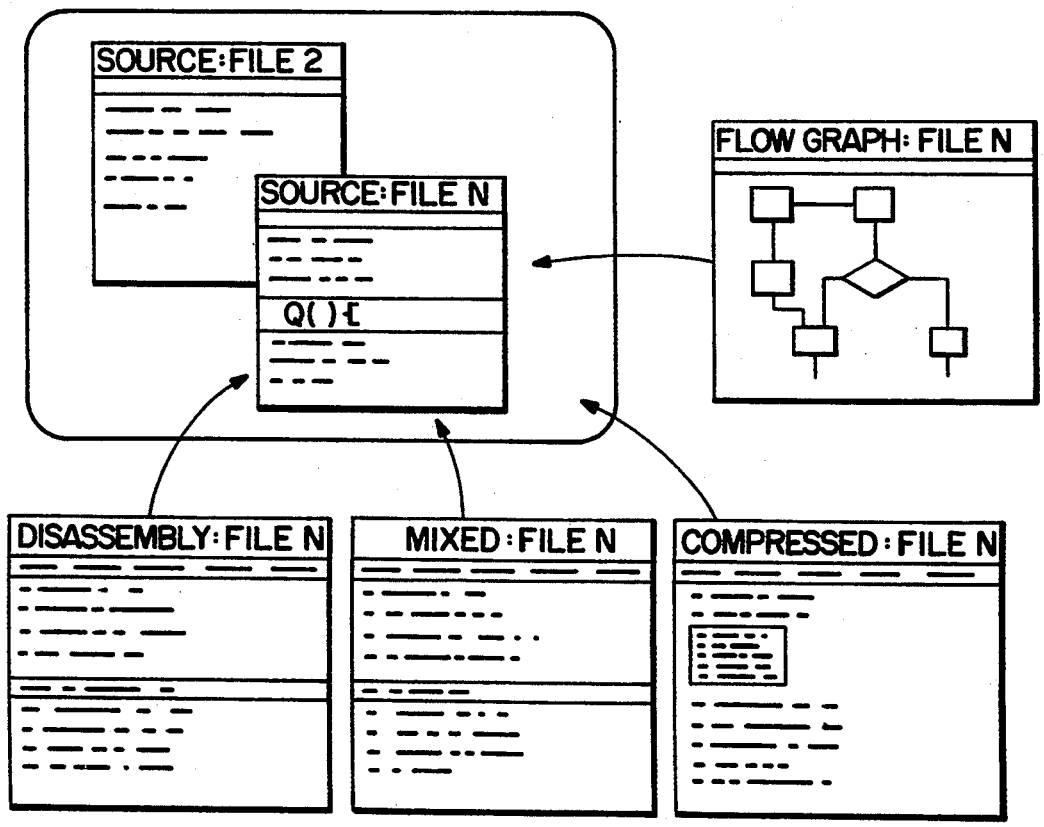
FIG. 6 illustrates a view of a source code listing from a file other than that shown in FIG. 3.
FIG. 7 illustrates the display of a plurality of source listings and further indicates the various additional types of code view-types which can be simultaneously displayed.

Referring now back to FIG. 3, it is assumed that the user steps highlight bar 42 from line 30 to line 31. This immediately results in a new file view, i.e., "file n" (FIG. 6) being displayed on the screen. Subroutine Q appears at line 9 and its initial code line is highlighted, followed by its subsidiary source code statements. At this stage, line 9 in FIG. 6 is the "active" code line and will be executed if the highlight bar is stepped to line 10. If there is no source listing for "file n", then a disassembly view-type is presented instead.

The above description, at a high level, indicates the views which are presented to a user as lines of code are stepped in a code listing of a program. It is often important for the user to have available, alternative presentations of the code listing for both comparison and fault analysis purposes. It is advantageous if those presentations can be simultaneously viewed on a screen so as to enable side-by-side comparison of code sequences. A screen presentation is shown in FIG. 7 wherein source code listings shown in FIGS. 3 and 6 are simultaneously presented for viewing by the user. As will be hereinafter understood, the invention enables the source listing for file n to be viewed; and/or for a disassembly listing of file n to be viewed, and/or for a mixed source/assembly listing to be viewed, and/or for compressed-view or flow graph versions of file n to also be viewed. In addition, in lieu of displaying file n, if source file 2 is the only view-type on the screen, the user can call one of the other view-types of file 2 to be simultaneously displayed, thereby providing two different code listings for the program contained within file 2. Furthermore, as many windows as desired can be displayed to provide further debugging capabilities.

Figure 8:
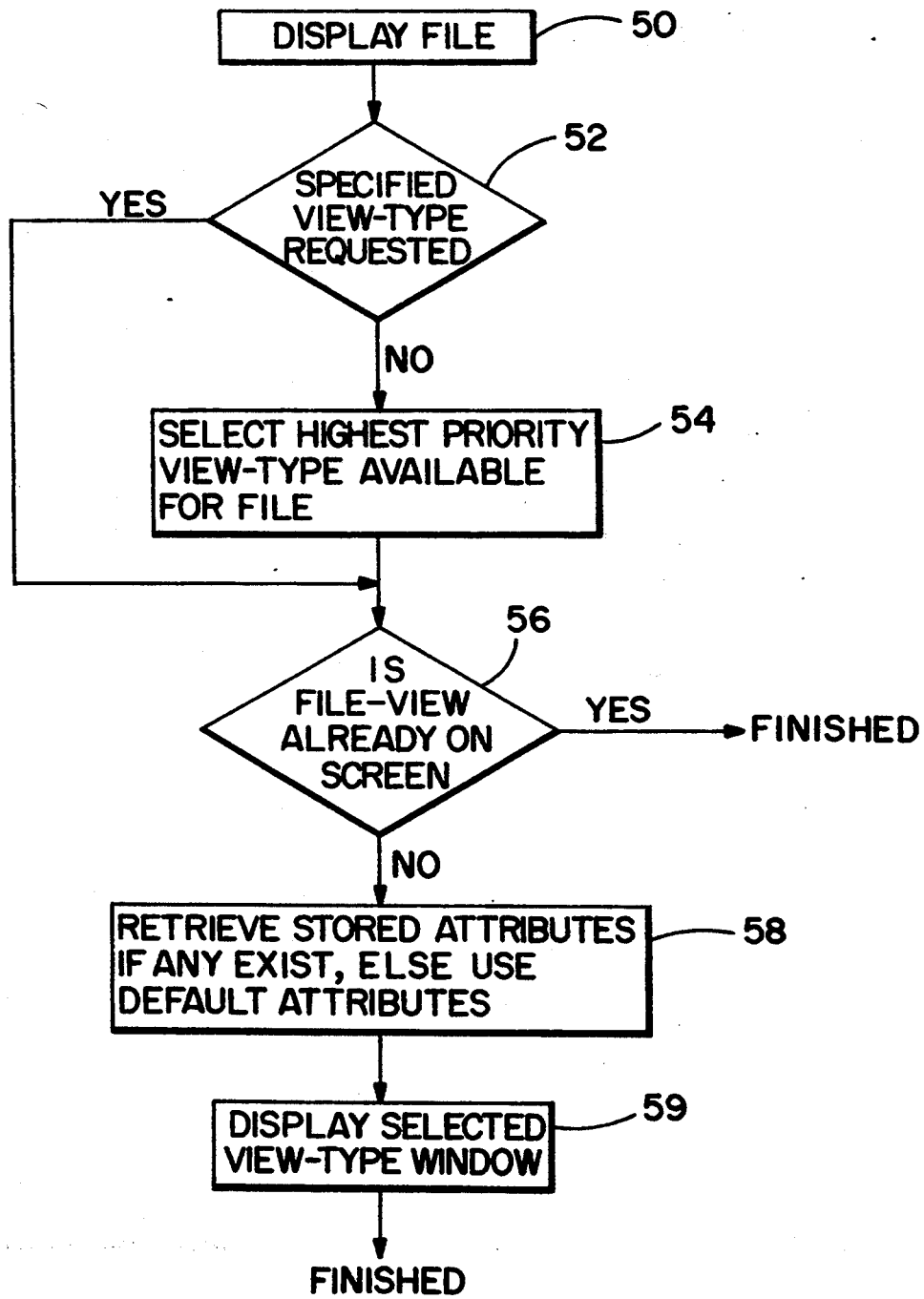
FIG. 8 is a high level flow diagram of the debug invention wherein multiple views may be simultaneously presented for a code listing appearing in a single file.

Referring to FIG. 8, a flow diagram is shown which presents the method for managing simultaneous presentation of a pair of view-types from a single file on a screen. Initially, the screen displays the current file view-type (Box 50) for user interaction. Subsequently, if the user requests another view (Box 52) but does not specify the view-type, the procedure selects the highest priority view-type available for the file (Box 54).

At this point, the procedure determines whether the user-selected new view-type is already on the screen (Box 58). If so, the subroutine exits (and the user must specify a new view type). Otherwise, stored attributes (or default attributes) are accessed (Box 58) and the selected view-type is displayed in window format (Box 59).

Figure 9:
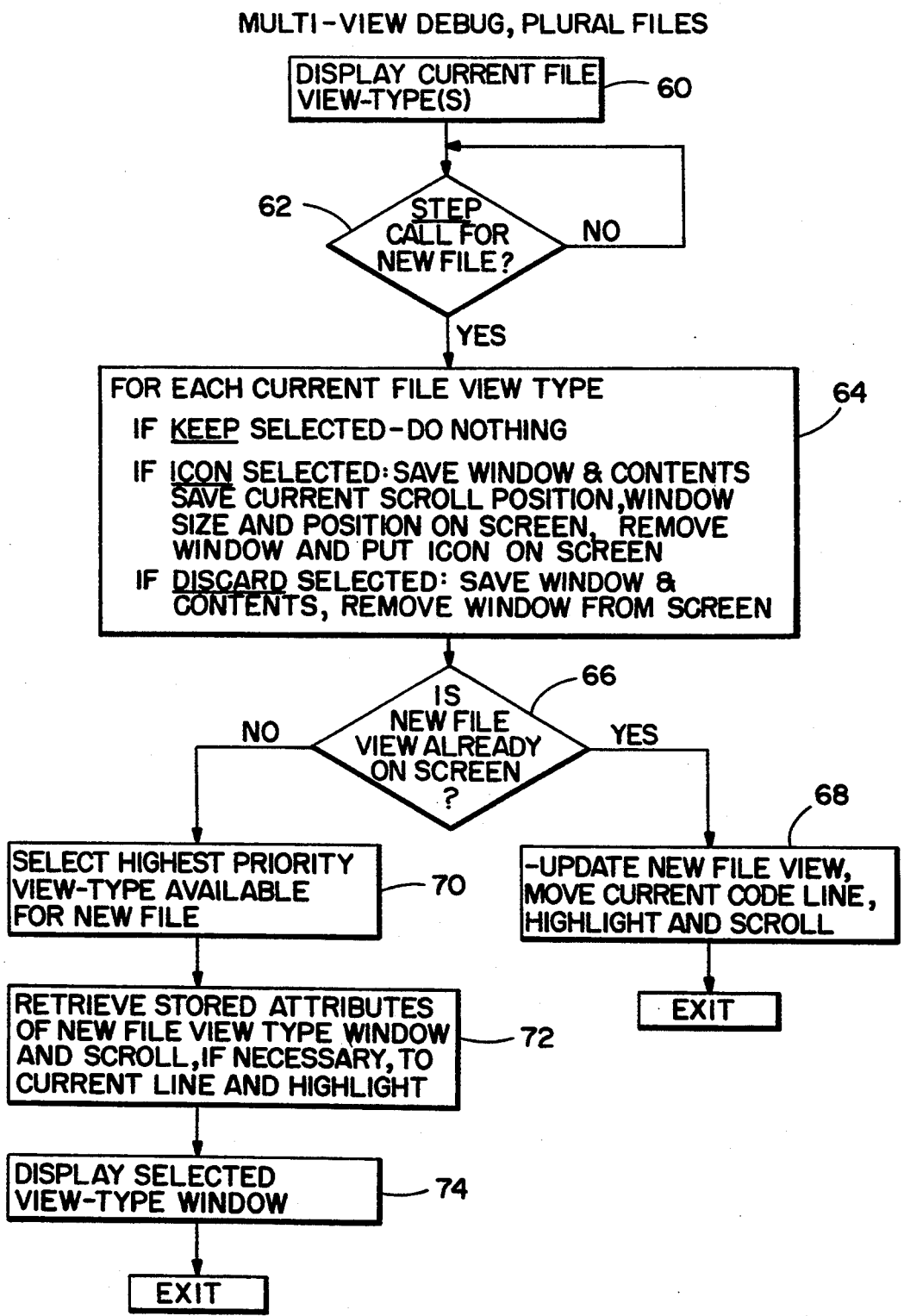
FIG. 9 is a high level flow diagram of the debug invention wherein multiple views may be simultaneously presented for code listings appearing in plural files.

Turning to FIG. 9, a procedure is shown where a debug action is in process and plural files are involved. Initially, a current file view-type (or types) is (are) displayed on the screen (Box 60). The user then steps a code line causing a new code line to be highlighted. The procedure determines whether the new code line calls for a new file (decision box 62) and if yes, it proceeds to select one of the three functions indicated in box 64. If Keep is selected, nothing occurs and the procedure continues. If Icon has been selected, the current file view-type window and its contents are saved, including the current scroll position, window size and its position on the screen. The window is removed and a small Icon is placed on the screen instead. If Discard is selected, the window is saved as with the Icon selection, and the window is removed from the screen.

Before placing a new file view on the screen, the procedure determines whether such a view is already present on the screen (decision box 66). If such a view is found on the screen, the procedure moves to box 68 where the new file view is updated by scrolling (if necessary) to bring the currently active code line into the window and the active line is highlighted.

If the new file view is found not to be present on the screen, then the program proceeds to select the highest priority view-type available for the new file. Generally, this will either be a source code listing or an assembly code listing. The stored attributes of the highest priority view-type are now retrieved and the code lines are scrolled, if necessary, to the currently active line, which line is then highlighted. The selected view-type window is then displayed (box 74). In this manner, the view-type window displays are managed, with a minimum of user-interaction, with automatic selection of prioritized view-types and with window recall ability that automatically re-displays the window as it last appeared.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A computer system for performing a method for displaying, on a screen, a plurality of views of software code listings, said computer system including a prioritized listing of view-types, each said view-type providing a different presentation of a code listing, said method comprising the steps of:

displaying a first view-type of at least a portion of a software code listing in a first file;

stepping through code lines in said portion of said software code listing;

when a call is found in said first file for a code listing in another file, displaying a highest priority view-type available in said computer system of said code listing in said another file where said highest priority view-type of said another file is independent of highest priority view-type of said first file; and upon a determination that a view-type is to be removed from said screen, and saving a window in which said view-type is displayed and its contents as an object, whereby said removed window and its contents are recallable as said object and when so recalled are displayed on said screen.

2. The method as defined in claim 1 wherein said view-type of said code listing from said another file is simultaneously displayed with said first view-type of said software code listing of said first file.

3. The method as recited in claim 2 comprising the step of:

determining if said highest priority view-type from said another file is already displayed on said screen, and if so, updating said displayed highest priority view-type to show a currently active code line.

4. The method of claim 3 wherein said prioritized listing of said view-types includes a source code listing as the highest priority.

5. The method of claim 4 wherein a view-type having a lower prioritization is a disassembly code listing.

6. The method of claim 5 wherein another said prioritized view-type includes both source code and disassembly code combined.

7. The method of claim 6 wherein another said prioritized view-type includes a compressed image of said source code listing.

8. The method of claim 7 wherein another said view-type includes a flow graph of said source code, which graphically illustrates said source code.

9. The method of claim 1, wherein the steps of the method are performed under the control of a debugging program.

10. A computer system for performing a method for displaying, on a screen, a plurality of views of a software code listing, said computer system including a prioritized listing of view-types, each said view-type providing a different presentation of a code listing, said method comprising the steps of:

displaying a first view-type of at least a portion of a software code listing in a first file;

stepping through code lines in said portion of said software code listing;

when a call is found in said first file for a code listing in another file, displaying a highest priority view-type available in said computer system of said code listing in said another file where said highest priority view-type of said another file is independent of highest priority view-type of said first file; and upon a determination that said first view-type is to be
i) kept on the screen, ii) removed from the screen and replaced by an icon, or iii) discarded from the screen, and if said first view-type is to be replaced by an icon or discarded, saving as an object, a window in which said first view-type is displayed and its contents by recording said software code listing's scroll position, size of the window and position of the window on the screen, whereby, in case it is discarded, said window and its contents may be recalled by reference to the file and an indication of view-type or in case said window is replaced by an icon, said window may be recalled by selecting said icon.

11. The method as recited in claim 10 comprising the step of:

determining if said highest priority view-type from said another file is already displayed on said screen, and if so, updating said displayed highest priority view-type to show a currently active code line.

* * * * *